Oct. 10, 1939.  E. W. GREEN ET AL  2,175,563
DEVICE FOR SEPARATING OIL FROM WATER CONTAMINATED THEREWITH
Filed March 31, 1938
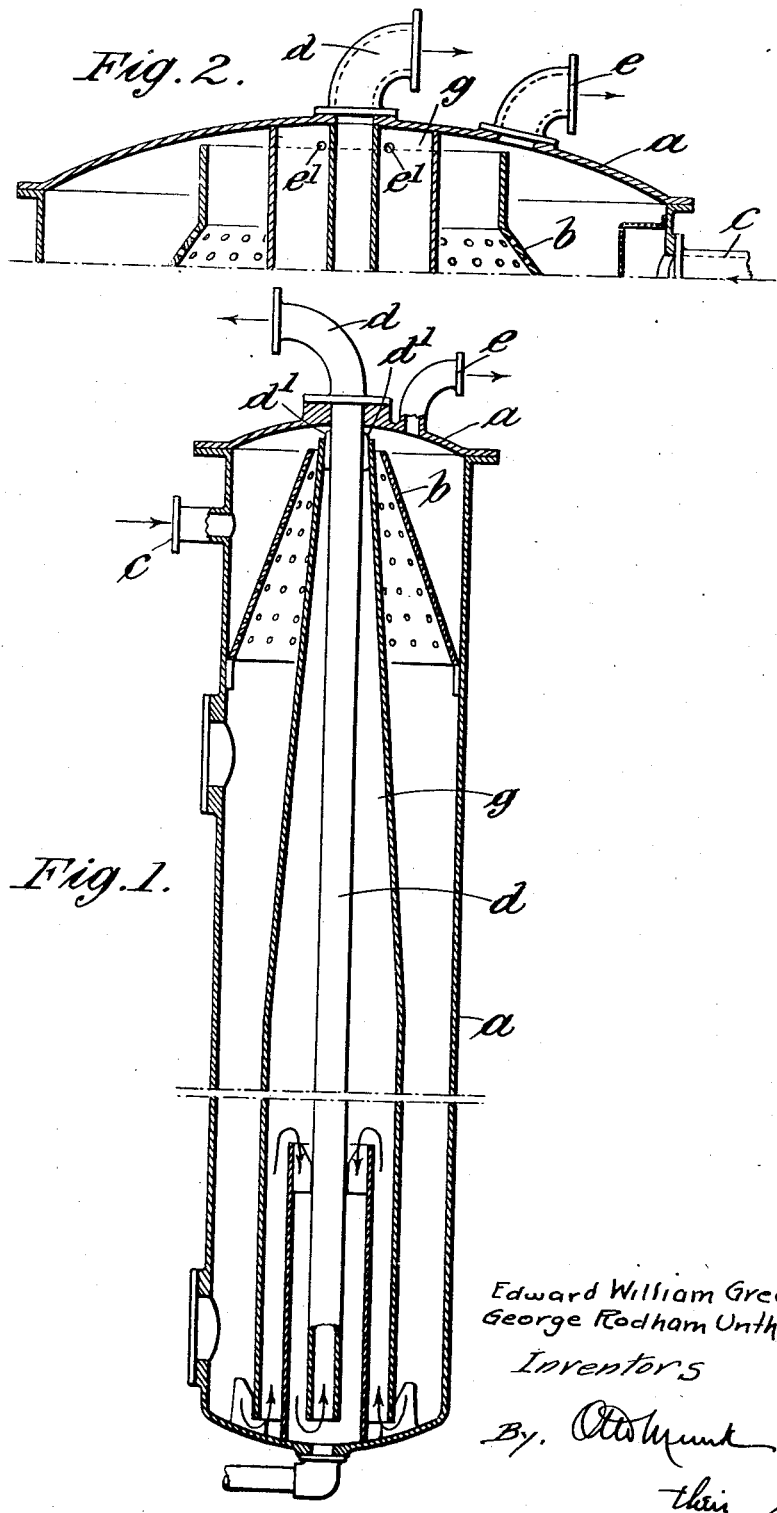
Edward William Green
George Rodham Unthank
Inventors Patented Oct. 10, 1939

2,175,563

UNITED STATES PATENT OFFICE 2,175,563

DEVICE FOR SEPARATING OIL FROM WATER CONTAMINATED THEREWITH

Edward William Green and George Rodham Unthank, London, England

Application March 31, 1938, Serial No. 199,176
In Great Britain March 11, 1938

4 Claims. (Cl. 210—61)

This invention relates to improvements in separating devices for treating oil polluted water of the type having primary and secondary separation zones in which the treatment is carried out while the liquids are under pressure and has for its object the provision of means for maintaining the water level in the primary and secondary zones of separation at a uniform level in order to avoid the risk of accumulation of oil in the secondary zone with the consequential result of recontaminating the water already freed from oil.

In known devices of this character the oil from the secondary zone of separation is discharged from the device through controllable means which are independent of the means for discharging the oil from the zone of primary separation and one of the purposes of this invention is to eliminate the above mentioned independent controllable means from the device. A further purpose is to arrange the parts of the apparatus so that they can be assembled in a device designed to be supported on a bulkhead or other vertical support.

The invention consists in a separator of the type described having a trunk dividing the zones of the primary and secondary separation from one another and communicating means from one zone to the other at the upper part of said trunk adapted to maintain the water level under uniform conditions in the said two zones.

It further consists in the details of construction by which the parts are arranged so that the device can be supported on a bulkhead.

In order that the invention may be the better understood we will now proceed to describe the same in relation to the accompanying drawing, reference being had to the letters and figures marked thereon. Like letters refer to like parts in the various figures, in which:—

Fig. 1 is a vertical section of a separator designed for support on a bulkhead or other vertical support.

Fig. 2 shows the upper part of a known separator of the type described but of a larger size than shown in Fig. 1 modified in form to embody this invention.

In carrying this invention into effect as shown in Fig. 1 it will be seen that the device consists of a long cylinder $a$ having a perforated distributing cone $b$ at its upper part which distributes the oil polluted water entering the cylinder $a$ through the pipe $c$ across the transverse area of the cylinder around a trunk $g$ which rests upon supports on the bottom of the cylinder $a$ so as to leave a space between the lower end of the trunk and the bottom of the cylinder, and is made at its upper part to surround a water discharge pipe $d$ and is guidedly supported thereon by projections $d'$ so as to leave an annular space around the pipe $d$ through which the oil collected by the trunk $g$ during the secondary separation can pass up to join the oil collected in the primary zone and is discharged through the oil discharge pipe $e$. The passage of the water through the separator is indicated by arrows.

In Fig. 2 it will be seen that the trunk $g$ which is integral with the cover is provided with one or more holes $e'$ at its upper part arranged so that the oil separated from the water in the secondary zone of separation will pass through the wall of the trunk $g$ and join the oil in the primary zone of separation on its way to the oil discharge pipe $e$ on the top of the chamber $a$. The level of water in the two zones is thus kept uniform during the working of the device and an independent oil discharge for the secondary zone is avoided.

We claim:

1. In a marine type pressure separator for oil and water always operated full of liquid, an upright closed pressure vessel, a perforated baffle in the upper portion of the vessel and having only its lower end meeting the vessel wall, a mixture inlet below the upper and open end of said baffle, an imperforate tubular member within and spaced from the baffle and extending substantially the length of the vessel and open at its upper and lower end portions, an imperforate tubular member within the bottom of said first mentioned tubular member and open only at its upper end whereby water entering at the bottom of the first mentioned tubular member is caused to enter the second at its top, and an outlet for oil free water from within and adjacent the bottom of the shorter tubular member.

2. In a marine type pressure separator for oil and water always operated full of liquid, an upright closed pressure vessel, an inclined perforated baffle in the upper portion of the vessel and having only its lower end meeting the vessel wall, a mixture inlet below the upper and open end of said baffle, an imperforate tubular member within and spaced from the baffle and extending substantially the length of the vessel and open at its upper and lower end portions, an imperforate tubular member within the bottom of said first mentioned tubular member and open only at its upper end whereby water entering at the bottom of the first mentioned tubular member is caused to enter the second at its top, and an outlet for oil free water from within and adjacent the bottom of the shorter tubular member.

3. In a marine type pressure separator for oil and water always operated full of liquid, an upright closed pressure vessel, a conical perforated baffle in the upper portion of the vessel and having only its lower end meeting the vessel wall, a mixture inlet below the upper and open end of said baffle, an imperforate tubular member within and spaced from the baffle and extending substantially the length of the vessel and open at its upper and lower end portions, an imperforate tubular member within the bottom of said first mentioned tubular member and open only at its upper end whereby water entering at the bottom of the first mentioned tubular member is caused to enter the second at its top, and an outlet for oil free water from within and adjacent the bottom of the shorter tubular member.

4. In a marine type pressure separator for oil and water always operated full of liquid, an upright closed pressure vessel, a perforated conical baffle in the upper portion of the vessel and having only its lower end meeting the vessel wall, a mixture inlet below the upper and open end of said baffle, an imperforate tubular member tapering toward the upper end within and spaced from the baffle and extending substantially the length of the vessel and open at its upper and lower end portions, an imperforate tubular member within the bottom of said first mentioned tubular member and open only at its upper end whereby water entering at the bottom of the first mentioned tubular member is caused to enter the second at its top, and an outlet for oil free water from within and adjacent the bottom of the shorter tubular member.

EDWARD WILLIAM GREEN.
GEORGE RODHAM UNTHANK.